(12) United States Patent
Zhang (10) Patent No.: US 12,259,644 B1
(45) Date of Patent: Mar. 25, 2025

(54) ROTATABLE CAMERA MOUNTING DEVICE

(71) Applicant: Shenzhen Yuntaida Technology Co., Ltd., Shenzhen (CN)

(72) Inventor: FeiXiang Zhang, Shenzhen (CN)

(73) Assignee: Shenzhen Yuntaida Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/921,038

(22) Filed: Oct. 21, 2024

(30) Foreign Application Priority Data

Oct. 11, 2024 (CN) .......................... 202422453399.0

(51) Int. Cl.
| | |
|---|---|
| *G03B 17/56* | (2021.01) |
| *F16M 11/04* | (2006.01) |
| *F16M 11/10* | (2006.01) |
| *F16M 11/12* | (2006.01) |
| *F16M 11/18* | (2006.01) |
| *F16M 11/20* | (2006.01) |

(52) U.S. Cl.
CPC ........... *G03B 17/561* (2013.01); *F16M 11/04* (2013.01); *F16M 11/10* (2013.01); *F16M 11/12* (2013.01); *F16M 11/18* (2013.01); *F16M 11/2014* (2013.01); *G03B 17/56* (2013.01)

(58) Field of Classification Search
CPC ...... G03B 17/561; G03B 17/56; F16M 11/18; F16M 11/2014; F16M 11/04; F16M 11/10; F16M 11/12
USPC ....................................................... 396/428
See application file for complete search history.

(56) References Cited

U.S. PATENT DOCUMENTS

| | | | | |
|---|---|---|---|---|
| 6,124,892 A | * | 9/2000 | Nakano | G08B 13/19632 |
| | | | | 348/373 |
| 8,075,203 B2 | * | 12/2011 | Johnson | F16B 2/065 |
| | | | | 396/428 |
| 9,641,730 B2 | * | 5/2017 | Rosenberry | F16M 13/00 |
| 11,500,271 B2 | * | 11/2022 | Liu | F16M 11/38 |
| 2014/0209777 A1 | * | 7/2014 | Klemin | F16M 13/04 |
| | | | | 29/525.08 |
| 2016/0219192 A1 | * | 7/2016 | Rosenberry | F16M 13/00 |
| 2021/0223668 A1 | * | 7/2021 | Wiley, Jr. | F16M 11/10 |
| 2021/0364899 A1 | * | 11/2021 | Wagner | F16M 13/04 |

FOREIGN PATENT DOCUMENTS

| | | | | |
|---|---|---|---|---|
| KR | 102040324 B1 | * | 11/2019 | .............. B66F 11/04 |
| WO | WO-2016096161 A1 | * | 6/2016 | ........... F16M 11/126 |
| WO | WO-2017084471 A1 | * | 5/2017 | .............. F16M 11/10 |

* cited by examiner

*Primary Examiner* — Stephanie E Bloss
*Assistant Examiner* — Kevin C Butler
(74) *Attorney, Agent, or Firm* — Ricky Lam (57) ABSTRACT

The present disclosure provides rotatable camera mounting device, wherein comprising: an upper base, wherein, the upper base comprises a loading surface and an upper base body connected to the loading surface, the upper base body comprises an upper base frame, a first connecting member, and a first reinforcing skeleton connected to the upper base frame, the first connecting member is provided with an accommodating cavity, and one end of the first connecting member away from the loading surface is provided with a first connecting surface.

18 Claims, 7 Drawing Sheets

ROTATABLE CAMERA MOUNTING DEVICE

FIELD

The present disclosure relates to the field of photography, and more specifically, to a rotatable camera mounting device.

BACKGROUND

With the development of society, people have increased their demand for the stability, intelligence, usability, and human-computer interaction of the camera mounting device. Traditional rotatable camera mounting devices are generally used to take photos for the objects or cannot carry heavy objects, and have a single or simple function and a low level of integration. There is an urgent need for a rotatable camera mounting device suitable for human and objects. The rotatable camera mounting device can be equipped with a 3D holographic device, which can display contents such as time, pictures, animations, etc., further enhancing the entertainment; a stable skeletal structure, including multiple reinforcing beams, greatly enhancing the strength of the upper base; LED ambient light, which enhances the fun and playability of the device; an AI voice control unit, greatly improving the efficiency and scene application of the device by adjusting the rotation of the device, switching or changing lights, and turning on and off the device by voice, enhancing the interaction between people and the device; the main electrical components such as the control device and motor are all located on the lower base, which can be installed and removed without disassembling the upper base, making it easy to install and maintain the entire machine.

SUMMARY

The technical problem solved by the present disclosure is the insufficient stability, intelligence, usability, and human-computer interaction of the existing rotatable camera mounting device.

In view of the above and other ideas, the present disclosure is proposed.

According to one aspect of the present disclosure, there is provided a rotatable camera mounting device, wherein comprising:

an upper base,
wherein, the upper base comprises a loading surface and an upper base body connected to the loading surface, the upper base body comprises an upper base frame, a first connecting member, and a first reinforcing skeleton connected to the upper base frame, the first connecting member is provided with an accommodating cavity, and one end of the first connecting member away from the loading surface is provided with a first connecting surface.

In one embodiment, the loading surface is provided with a first opening.

In one embodiment, the first connecting member is provided with a second opening opposite to the first opening and a third opening opposite to the second opening.

In one embodiment, the accommodating cavity is configured to accommodate a 3D holographic device, the 3D holographic device comprising a 3D holographic device body extending into the accommodating cavity through the third opening and a 3D holographic device fixing surface, and the 3D holographic device fixing surface is connected to the first connecting surface.

In one embodiment, the first reinforcing skeleton comprises two or more first reinforcing beams, and two ends of each of the first reinforcing beams are connected to the upper base frame.

In one embodiment, the upper base body further comprises a second reinforcing skeleton, wherein the second reinforcing skeleton comprises two or more second reinforcing beams, and two ends of each of the second reinforcing beams are respectively connected to the upper base frame and the first reinforcing beam.

In one embodiment, the first connecting member comprises grooves that match the first reinforcing skeleton.

In one embodiment, when the first reinforcing skeleton comprises two of the first reinforcing beams, the first connecting member comprises two grooves, and each groove is equipped with one of the first reinforcing beams.

In one embodiment, the first connecting member is provided with a first limiting surface opposite to the first connecting surface, and the second opening is provided on the first limiting surface.

In one embodiment, the upper base further comprises a transparent plate that matches the first opening, and the transparent plate abuts the first limiting surface.

In one embodiment, the rotatable camera mounting device further comprises a lower base opposite to the upper base and a connecting unit connecting the upper base and the lower base.

In one embodiment, the connecting unit comprises a second connecting member connected to the first connecting member, a bearing member connected to the second connecting member, and a third connecting member connected to the bearing member and the lower base.

In one embodiment, the second connecting member is provided with a second connecting surface near the first connecting surface, and the first connecting surface is connected to the second connecting surface.

In one embodiment, the second connecting member is provided with a second connecting end away from the first connecting surface, and the second connecting end is connected to an upper end surface of a bearing inner ring of the bearing member.

In one embodiment, the third connecting member is provided with a third connecting surface near one end of the bearing member, and the third connecting surface is connected to a lower end surface of the bearing inner ring of the bearing member.

In one embodiment, a third connecting end is provided at one end of the third connecting member away from the bearing member, and the third connecting end is connected to the lower base.

In one embodiment, the lower base is provided with a lower base frame and a third reinforcing skeleton, and the third reinforcing skeleton intersects with each other to form a fourth connecting end for connecting the third connecting member.

In one embodiment, the rotatable camera mounting device further comprises a driving device, the driving device comprising a motor, a driving wheel connected to the motor, the bearing member, and a rotating device connected to the bearing member, wherein the bearing member rotates with the driving wheel.

In one embodiment, the bearing member further comprises a bearing outer ring, wherein the bearing outer ring is provided with teeth that match the driving wheel, and one end of the rotating device is connected to the bearing outer ring.

In one embodiment, the rotating device comprises a first rotating unit connected to the bearing outer ring, a second rotating unit connected to the first rotating unit, and a third rotating unit rotatably connected to the second rotating unit.

In one embodiment, the second rotating unit is nested inside the first rotating unit.

In one embodiment, fasteners are provided on the first rotating unit to adjust length of the second rotating unit nested inside the first rotating unit and to fix the second rotating unit.

In one embodiment, the side of the upper base frame has a channel, which is provided with an ambient light, and a transparent cover is provided on the outer side of the channel to adhere to the upper base frame.

In one embodiment, the side of the lower base frame has a channel, which is provided with an ambient light, and the outer side of the channel is provided with a transparent cover that adheres to the lower base frame.

In one embodiment, the rotatable camera mounting device further comprises an AI voice device and a main control device, wherein the main control device is configured to create instructions and control the rotatable camera mounting device to perform actions after obtaining user voice collected by the AI voice device.

In one embodiment, the AI voice device comprises a microphone device configured to capture the user's voice when the user speaks.

In one embodiment, the AI voice device further comprises a speaker device configured to provide voice feedback under the control of the main control device when the microphone device acquires user voice.

In one embodiment, the action includes controlling activation, deactivation, lighting mode switching, or brightness adjustment of the ambient light.

In one embodiment, one end of the first rotating unit connected to the bearing outer ring is provided with multiple connecting fins, which extend outward to form a clearance space for avoiding the second connecting end.

In one embodiment, the first rotating unit comprises multiple first cantilevers, and the second rotating unit comprises second cantilevers corresponding to the first cantilevers, each of which is nested inside the first cantilever.

In one embodiment, the loading surface is detachably connected to the upper base frame and/or the loading surface is integrally formed with the upper base frame.

According to another aspect of the present disclosure, there is provided a rotatable camera mounting device, comprising:
- a driving device comprising a motor, a rotatable disc device connected to the motor, and a rotating device connected to the rotatable disc device, wherein the rotating device is configured to rotate circumferentially with the motor; and
- a third connecting member used to fix the rotatable disc device on the rotatable camera mounting device.

In one embodiment, the rotatable camera mounting device comprises a driving wheel connected to the motor.

In one embodiment, the rotatable disc device comprises a bearing inner ring fixed to the rotatable camera mounting device by the third connecting member, and a bearing outer ring that rotates relative to the bearing inner ring and engages with the driving wheel.

In one embodiment, the rotatable camera mounting device comprises a lower base, which is provided with a lower base frame and a third reinforcing skeleton, and the third connecting member is fixedly installed on the third reinforcing skeleton.

In one embodiment, the rotatable camera mounting device further comprises:
- an upper base arranged opposite to the lower base,
- wherein, the upper base comprises a loading surface and an upper base body, the upper base body comprises an upper base frame and a first connecting member, the first connecting member is provided with a first connecting surface at one end away from the loading surface.

In one embodiment, the rotatable camera mounting device further comprises a second connecting member connected to the first connecting surface and connected to the bearing inner ring.

In one embodiment, the second connecting member is provided with a second connecting surface near the first connecting surface, and the first connecting surface is connected to the second connecting surface.

In one embodiment, the second connecting member is provided with a second connecting end away from the first connecting surface, and the second connecting end is connected to an upper end surface of the bearing inner ring.

In one embodiment, a third connecting surface is provided at one end of the third connecting member near the bearing inner ring, and the third connecting surface is connected to a lower end surface of the bearing inner ring.

In one embodiment, a third connecting end is provided at one end of the third connecting member away from the bearing inner ring, and the third connecting end is connected to the third reinforcing skeleton.

In one embodiment, the third reinforcing skeleton intersects with each other to form a fourth connecting end for connecting the third connecting end.

In one embodiment, the rotating device comprises a first rotating unit connected to the bearing outer ring, a second rotating unit connected to the first rotating unit, and a third rotating unit rotatably connected to the second rotating unit.

The rotatable camera mounting device can be equipped with a 3D holographic device, which can display contents such as time, pictures, animations, etc., further enhancing the entertainment; a stable skeletal structure, including multiple reinforcing beams, greatly enhancing the strength of the upper base; LED ambient light, which enhances the fun and playability of the device; an AI voice control unit, greatly improving the efficiency and scene application of the device by adjusting the rotation of the device, switching or changing lights, and turning on and off the device by voice, enhancing the interaction between people and the device; the main electrical components such as the control device and motor are all located on the lower base, which can be installed and removed without disassembling the upper base, making it easy to install and maintain the entire machine.

More embodiments of the present disclosure can also achieve other advantageous technical effects not listed one by one, which may be partially described in the following and can be expected and understood by those skilled in the art after reading the present disclosure.

BRIEF DESCRIPTION OF THE DRAWINGS

In order to provide a clearer explanation of the technical solution in the embodiments of the present application, a brief introduction will be given below to the accompanying drawings required in the embodiments or prior art descriptions. It is evident that the accompanying drawings in the following description are only some embodiments of the present application. For those skilled in the art, other accom

DETAILED DESCRIPTION

In order to clarify the purpose, technical solution, and advantages of the embodiments of the present disclosure, the following will provide a clear and complete description of the technical solution in the embodiments of the present disclosure in conjunction with the accompanying drawings. Obviously, the described embodiments are one part of the embodiments of the present disclosure, not all of them. The components of the embodiments of the present disclosure described and illustrated in the accompanying drawings can be arranged and designed in various different configurations.

Therefore, the detailed description of the embodiments of the present disclosure provided in the accompanying drawings is not intended to limit the scope of the present disclosure, but only to represent selected embodiments of the present disclosure. Based on the embodiments in the present disclosure, all other embodiments obtained by ordinary skilled persons in this field without creative labor are within the scope of protection of the present disclosure.

It should be noted that similar labels and letters represent similar items in the following figures. Therefore, once an item is defined in one figure, it does not need to be further defined and explained in subsequent figures.

It should be understood that the terms "up", "down", "front", "back", "left", "right", "horizontal", etc. indicate the orientation or position relationship based on the orientation or position relationship shown in the drawings, only for the convenience of describing and simplifying the description of the present application, rather than indicating or implying that the device or component referred to must have a specific orientation, be constructed and operated in a specific orientation, and therefore cannot be understood as a limitation of the present application. In addition, the terms "first", "second", "third", etc. are only used to distinguish descriptions and cannot be understood as indicating or implying relative importance. In the description of the present disclosure, unless otherwise specified, the meaning of "multiple" refers to two or more.

As used in this application, the terms "installation", "connection", "connecting", "fixed" and other terms should be broadly understood, for example, they can be fixed connections, detachable connections, or integrated connections; It can be a mechanical connection or an electrical connection; It can be directly connected, or indirectly connected through an intermediate medium, or it can be an internal connection between two components. For ordinary technical personnel in this field, the specific meanings of the above terms in this application can be understood based on specific circumstances.

In the present disclosure, unless otherwise specified and limited, the first feature above or below the second feature may include direct contact between the first and second features, or may include contact between the first and second features through another feature between them instead of direct contact. Moreover, the first feature being "above", and "on" the second feature includes the first feature being directly above and diagonally above the second feature, or simply indicating that the first feature is horizontally higher than the second feature. The first feature being "below" include the first feature being directly below and diagonally below the second feature, or simply indicating that the first feature has a lower horizontal height than the second feature.

The embodiments of the present disclosure are described in detail below, and examples of the embodiments are shown in the accompanying drawings, where the same or similar reference numerals from beginning to end represent the same or similar elements or elements with the same or similar functions. The embodiments described below with reference to the accompanying drawings are exemplary and are only used to explain the present disclosure, and should not be understood as limiting the present disclosure.

As shown in FIGS. 1-5, the rotatable camera mounting device comprises: an upper base 1, wherein the upper base 1 comprises a loading surface 10, an upper base body 11 connected to the loading surface 10, the upper base body 11 comprising an upper base frame 110, a first reinforcing skeleton 111 connected to the upper base frame 110, and a first connecting member 112, wherein the first connecting member 112 is provided with an accommodating cavity 1120, and a first connecting surface 1121 is provided at one end of the first connecting member 112 away from the loading surface 10. As shown in FIG. 6, the loading surface 10 is provided with a first opening 101. The upper base 1 also includes a transparent plate 12 that matches the first opening 101, such as a transparent tempered glass, whose surface is flush with the surface of the loading surface 10. The transparent tempered glass, due to its high hardness and wear resistance, can ensure that people or objects are placed on it without damage. The loading surface 10 can be used for standing people or placing items. The loading surface 10 is detachably connected to the upper base frame 110 and/or the loading surface 10 is integrally formed with the upper base frame 110.

Figure 2:
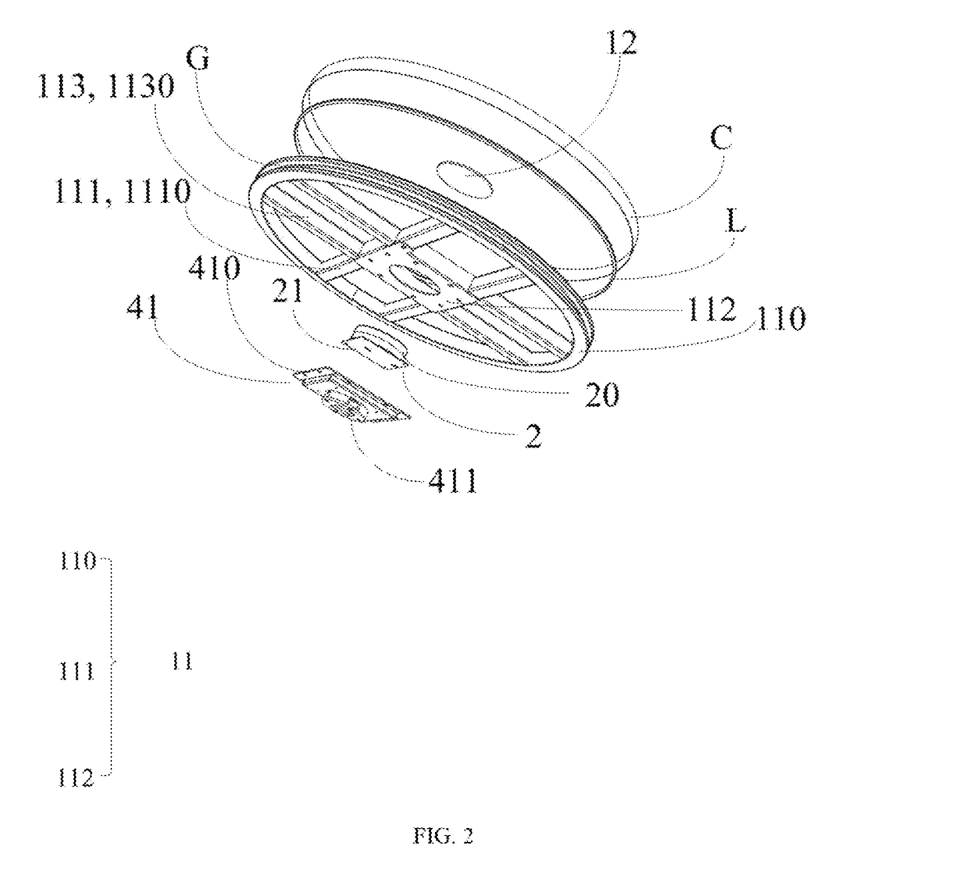
FIG. 2 shows an exploded view of the upper base of the rotatable camera mounting device of the present application.
Figure 4:
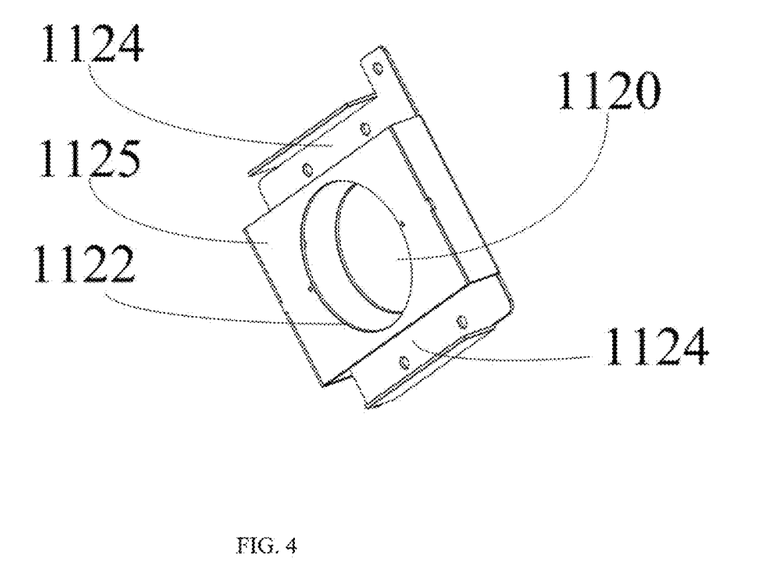
FIG. 4 shows a perspective view of the first connecting member of the rotatable camera mounting device of the present application.
Figure 5:
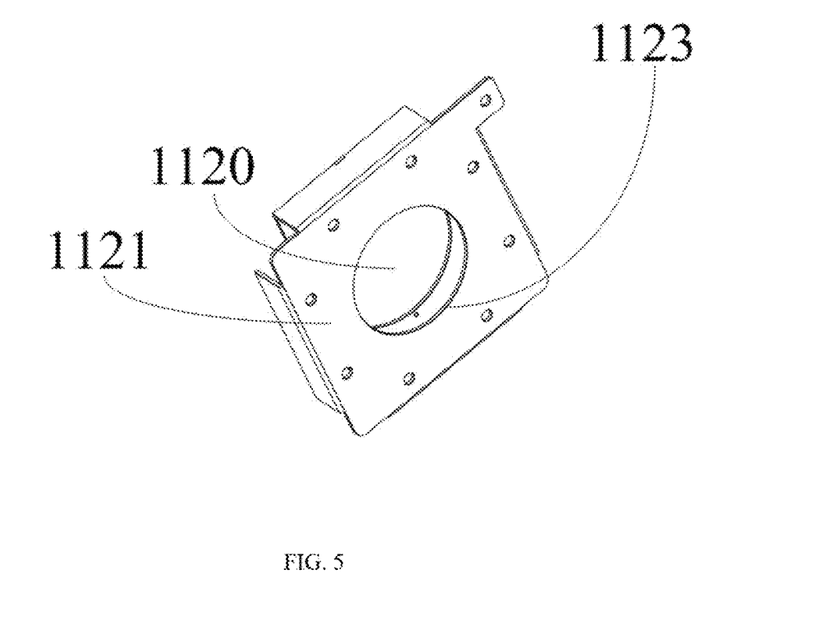
FIG. 5 shows another perspective view of the first connecting member of FIG. 4.
Figure 6:
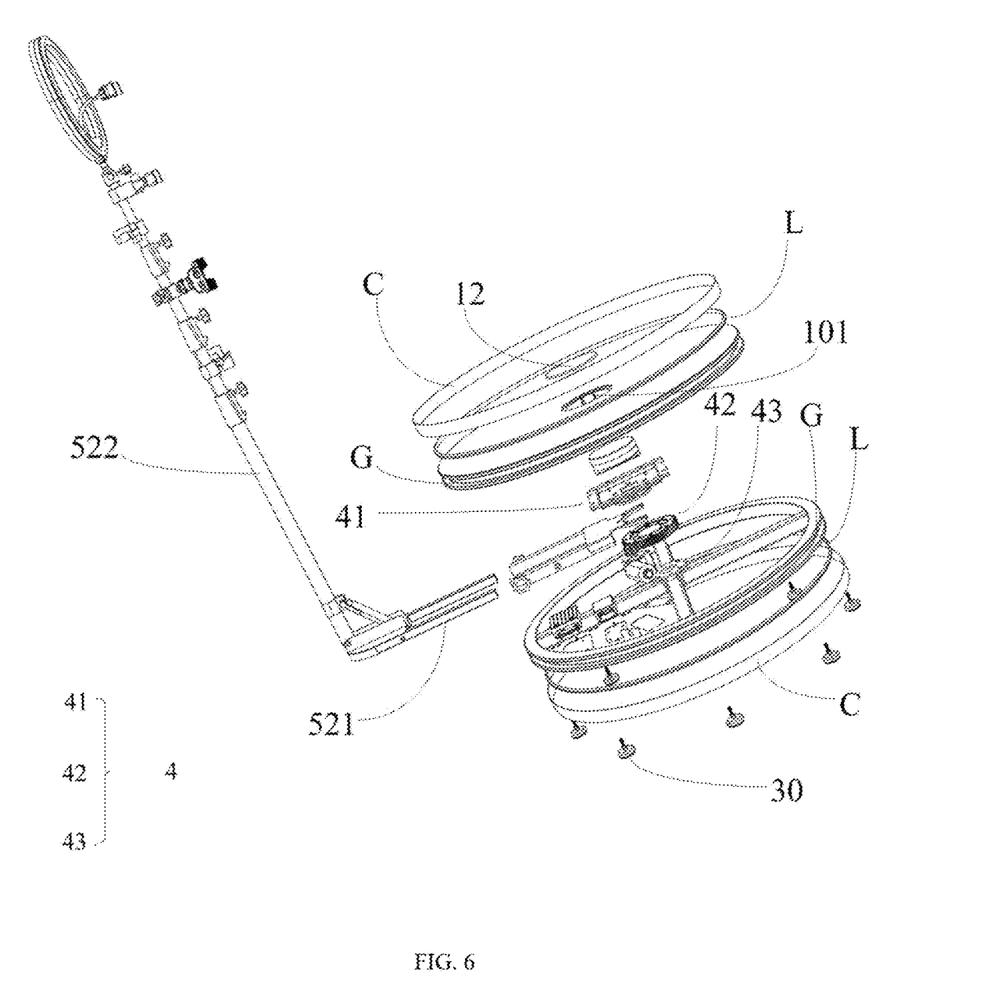
FIG. 6 shows another exploded view of the rotatable camera mounting device of the present application.

As shown in FIGS. 4-5, the first connecting member 112 is provided with a second opening 1122 opposite to the first opening 101 and a third opening 1123 opposite to the second opening 1122. As shown in FIGS. 2, 4, and 5, the accommodating cavity 1120 is configured to accommodate the 3D holographic device 2. The 3D holographic device 2 includes a 3D holographic device body 20 that extends into the accommodating cavity 1120 through a third opening 1123, and a 3D holographic device fixing surface 21 that is connected to the first connecting surface 1121. In one embodiment, holes are provided on the fixing surface 21 of the 3D holographic device, and the first connecting surface 1121 is also provided with holes. The fixing surface 21 of the 3D holographic device is connected to the first connecting surface 1121 by installing screws on the holes. The transparent tempered glass is used to display the program images of 3D holographic device 2. After the 3D holographic device 2 is activated, it can display animations, images, time, etc. through the transparent properties of the tempered glass.

It should be noted that, in another example, the first connecting member and the first reinforcing skeleton can enclose to form the accommodating cavity.

As shown in FIG. 2, the first reinforcing skeleton 111 includes two or more first reinforcing beams 1110, and two ends of each of the first reinforcing beams 1110 are connected to the upper base frame 110. In one embodiment, the first reinforcing skeleton 111 comprises two first reinforcing beams 1110. The two ends of each of the first reinforcing beams 1110 are connected to the upper base frame 110, and the two first reinforcing beams 1110 extend parallel to each other or in approximately the same direction. By setting the first reinforcing beam 1110 to enhance the strength of the upper base frame 110, the loading surface 10 can be used for standing people or placing objects.

As shown in FIG. 2, the upper base body 11 also includes a second reinforcing skeleton 113, which includes two or more second reinforcing beams 1130. The two ends of each of the second reinforcing beams 1130 are respectively connected to the upper base frame 110 and the first reinforcing beam 1110. In one embodiment, the second reinforcing skeleton 113 includes four second reinforcing beams 1130, and two ends of each of the second reinforcing beams 1130 are respectively connected to the upper base frame 110 and the first reinforcing beam 1110. The length of the second reinforcing beam 1130 is shorter than that of the first reinforcing beam 1110. Each of the first reinforcing beams 1110 is connected to two of the second reinforcing beams 1130. By setting the second reinforcing beam 1130, the strength of the upper base frame 110 can be further enhanced, so that the loading surface 10 can be used for standing people or placing objects. Due to the need to carry people or objects for photography, the load-bearing and stability of the upper base 1 have been further strengthened structurally with multiple reinforcing beams, greatly enhancing the load-bearing strength of the upper base 1.

As shown in FIG. 2, the two ends of each of the first reinforcing beam 1110 are connected to the upper base frame 110, while two ends of each of the second reinforcing beams 1130 are respectively connected to the upper base frame 110 and the first reinforcing beam 1110. In one embodiment, holes can be provided on the first connecting member 112, and holes can also be provided at corresponding positions of the first reinforcing beam 1110. The first connecting member 112 is fixedly connected to the first reinforcing beam 1110 by screws and the likes. Alternatively, the first connecting member 112 can be fixedly connected to the first reinforcing beam 1110 through welding.

As shown in FIGS. 4-5, the first connecting member 112 also includes grooves 1124 that match the first reinforcing skeleton 111. When the first reinforcing skeleton 111 includes two first reinforcing beams 1110, the first connecting member 112 includes two grooves 1124, each groove 1124 is equipped with one first reinforcing beam 1110. In one embodiment, two first reinforcing beams 1110 extend parallel to each other or in approximately the same direction, and each groove 1124 is equipped with a first reinforcing beam 1110, restricting the left and right shaking or moving of the first connecting member 112 through the first reinforcing beam 1110. The first connecting member 112 and the first reinforcing beam 1110 can be connected by screws. Alternatively, the first connecting member 112 and the first reinforcing beam 1110 can be connected by welding.

As shown in FIGS. 4-5, the first connecting member 112 is provided with a first limiting surface 1125 opposite to the first connecting surface 1121, and the second opening 1122 is provided on the first limiting surface 1125. In one embodiment, when the upper base 1 includes a transparent plate 12 that matches the first opening 101, the transparent plate 12 contacts the first limiting surface 1125. The transparent plate 12 is set inside the first opening 101, which means that the outer side of the transparent plate 12 is in contact with the inner side of the first opening 101, so the left and right movement of the transparent plate 12 is restricted by the first opening 101. By setting the first limiting surface 1125, the movement of the transparent plate 12 in the height direction can be restricted.

As shown in FIGS. 1-3 and 6, the rotatable camera mounting device also includes a lower base 3 opposite to the upper base 1 and a connecting unit 4 connecting the upper base 1 and the lower base 3. The connecting unit 4 includes a second connecting member 41 connected to the first connecting member 112, a bearing member 42 connected to the second connecting member 41, and a third connecting member 43 connected to the bearing member 42 and the lower base 3. The second connecting member 41 is provided with a second connecting surface 410 near the first connecting surface 1121, and the first connecting surface 1121 is detachably connected to the second connecting surface 410. The second connecting member 41 is provided with a second connecting end 411 away from the first connecting surface 1121, and the second connecting end 411 is connected to an upper end surface of a bearing inner ring 420 of the bearing member 42. A third connecting surface 430 is provided at one end of the third connecting member 43 near the bearing member 42, and the third connecting surface 430 is connected to the lower end surface of the bearing inner ring 420 of the bearing member 42. The end of the third connecting member 43 away from the bearing member 42 is provided with a third connecting end (not shown), which is connected to the lower base 3. The lower end of the lower base 3 is equipped with foot cups 30, which can be adjusted to a certain height, allowing the rotatable camera mounting device to remain stable in different usage environments.

Figure 1:
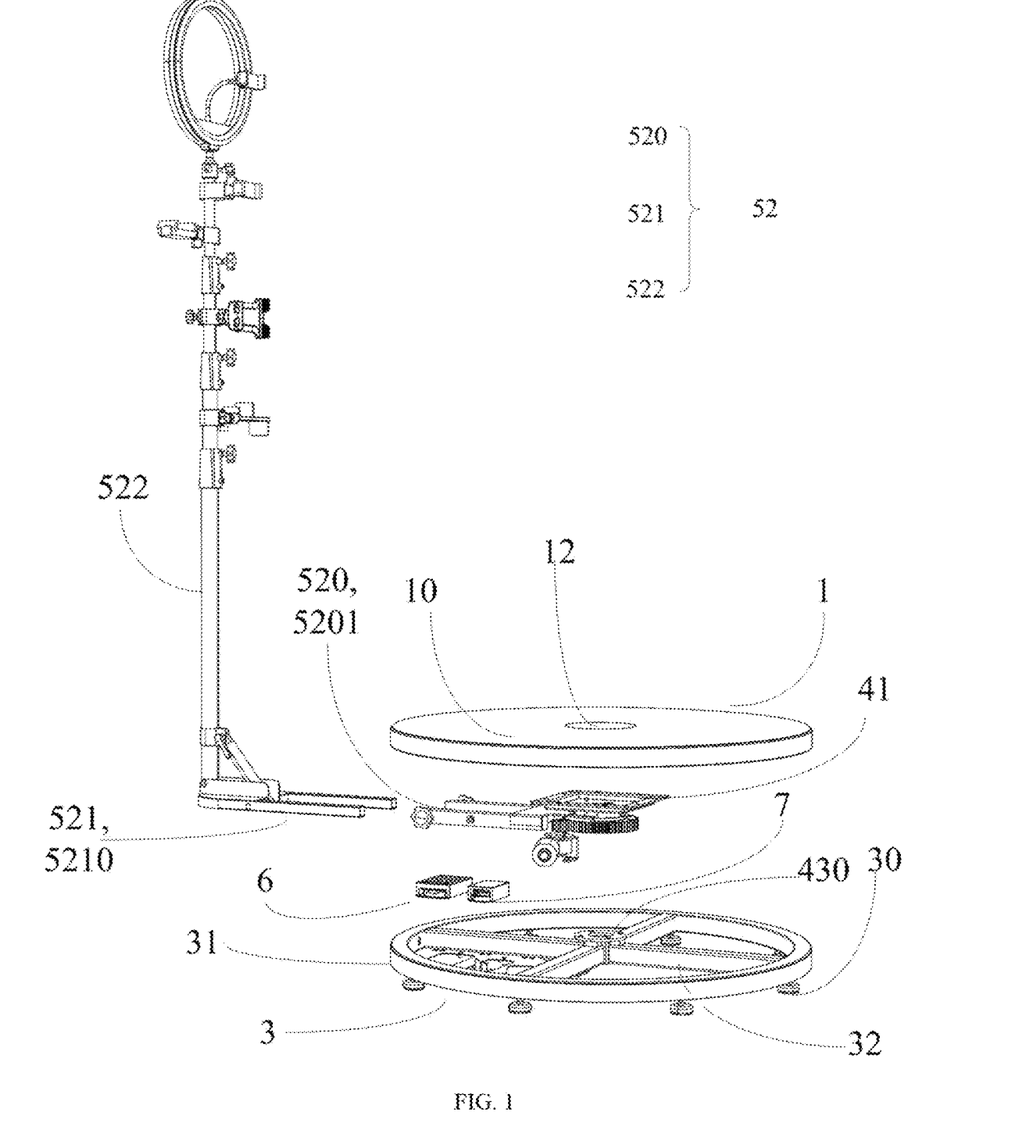
- FIG. 1 shows an exploded view of the rotatable camera mounting device of the present application.
Figure 3:
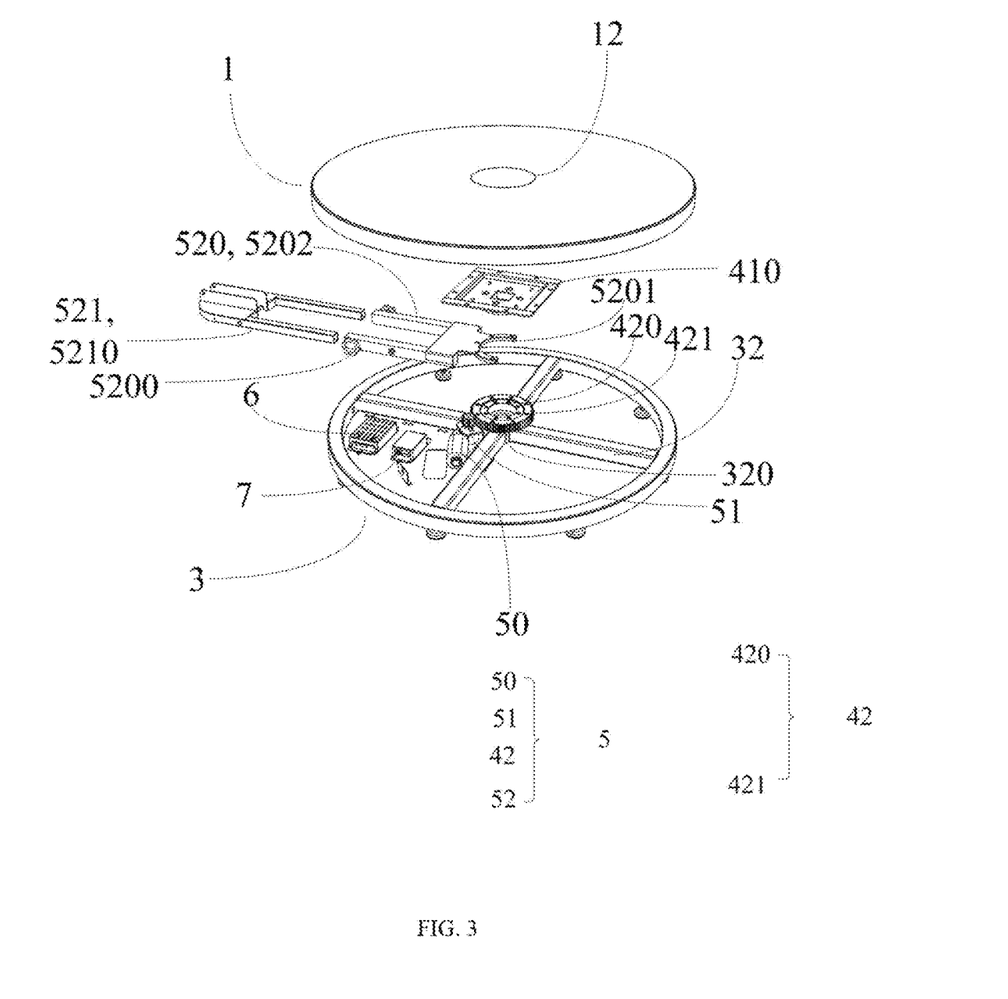
FIG. 3 shows an exploded view of the upper base, lower base, and the connecting unit of the rotatable camera mounting device of the present application.

As shown in FIGS. 1, 3, and 6, the lower base 3 is equipped with a lower base frame 31 and a third reinforcing skeleton 32. The third reinforcing skeleton 32 intersects with each other to form a fourth connecting end 320 for connecting the third connecting end.

As shown in FIGS. 1, 3, and 6, the rotatable camera mounting device also includes a driving device 5, which includes a motor 50, a driving wheel 51 connected to the motor 50, a bearing member 42, and a rotating device 52 connected to the bearing member 42. The bearing member 42 engages with the driving wheel 51. The rotating device 52 can rotate in the circumferential direction around the upper base 1 and the lower base 3 and can be equipped with a camera equipment. The camera equipment can include mobile phones, tablets, computers, cameras, etc. Motor 50 can be used to drive the rotating device 52 to rotate in the circumferential direction around the upper base 1 and the lower base 3. In one embodiment, the bearing member 42 can rotate with the driving wheel 51 under the action of a belt.

Figure 7:
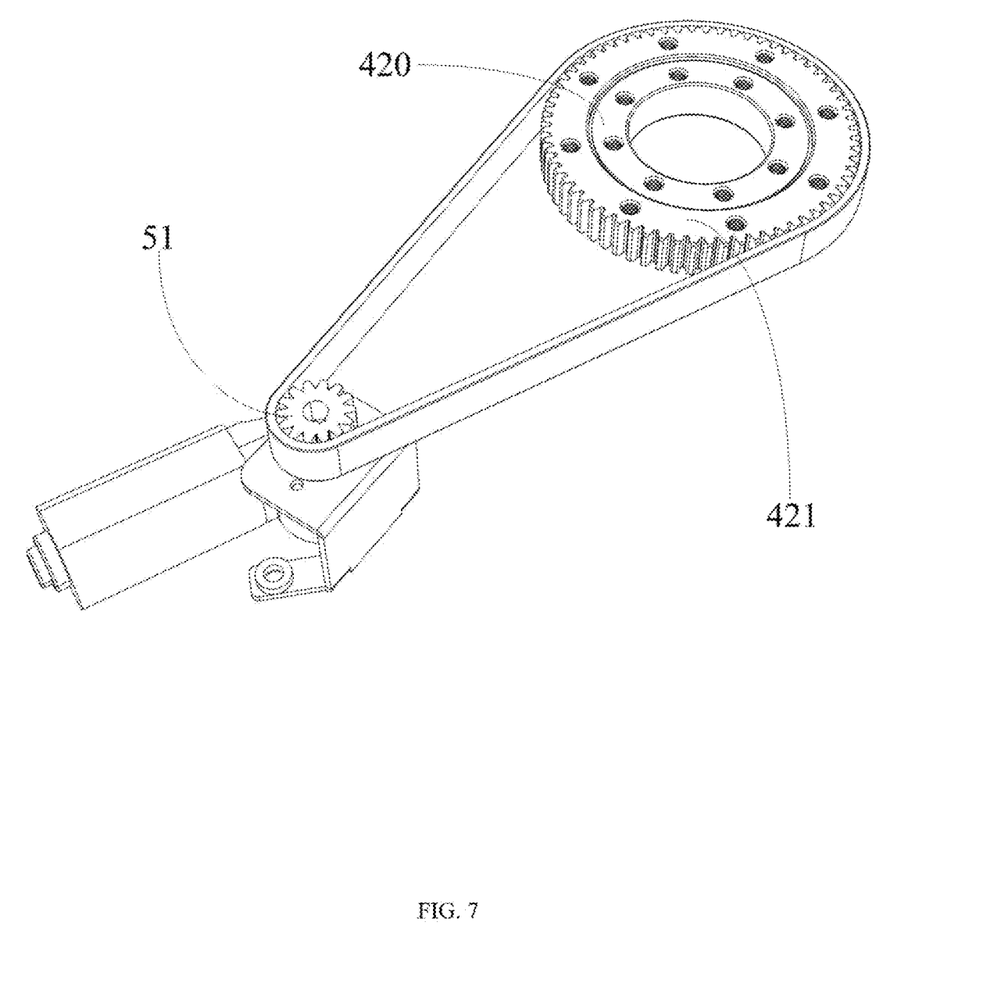
FIG. 7 shows the structure between the driving wheel and the bearing outer ring in one embodiment of the present application.

As shown in FIG. 3, the bearing member 42 also includes a bearing outer ring 421, which is provided with teeth that match the driving wheel 51, and one end of the rotating device 52 is connected to the bearing outer ring 421. The bearing member 42 of the driving device 5 is installed at the upper end surface of the lower base 3. The bearing member 42 is a specially designed bearing, which is divided into a bearing inner ring 420 and a bearing outer ring 421. Both the bearing inner ring 420 and the bearing outer ring 421 can easily rotate. The bearing member 42 is fixedly installed on the lower base 3 through the holes on the bearing inner ring 420, ensuring that the bearing inner ring 420 of the bearing member 42 remains fixed. The bearing outer ring 421 of the bearing member 42 is provided with teeth and mounting holes for the rotating device 52, making it easy for the rotating device 52 to be fixedly installed on the outside of the bearing member 42. In addition, the motor 50 is fixedly installed at the bottom of the lower base 3. After installation, the driving wheel 51 connected to the motor 50 engages perfectly with the teeth of the bearing outer ring 421. When the motor 50 is working, the rotation of the small gear or wheel on the motor 50 drives the large gear or wheel on the outside of the bearing member 42 to rotate together, further driving the rotating device 52 fixedly installed on the bearing outer ring 421 to rotate in the circumferential direction around the upper base 1 and the lower base 3. In one embodiment, the bearing outer ring 421 can rotate with the driving wheel 51 under the action of the belt, as shown in FIG. 7. In one embodiment, the bearing outer ring 421 can also be connected to another gear to act as a driven wheel.

As shown in FIGS. 1 and 3, the rotating device 52 includes a first rotating unit 520 connected to the bearing outer ring 421, a second rotating unit 521 connected to the first rotating unit 520, and a third rotating unit 522 rotatably connected to the second rotating unit 521. The second rotating unit 521 are nested inside the first rotating unit 520. The third rotating unit 522 can be set as a telescopic rod, used to fix various auxiliary equipment such as fill lights, mobile phones, cameras, tablets, etc. The rod body and its connecting members are made of metal material, which enhances the stability and durability of the product.

As shown in FIGS. 1 and 3, the first rotating unit 520 is equipped with fasteners 5200, which are used to adjust length of the second rotating unit 521 nested inside the first rotating unit 520 and to fix the second rotating unit 521. The fasteners 5200 can be screws, for example. The second rotating unit 521 can be adjusted by pulling and pushing on the first rotating unit 520, and then fixed by screws, making it easy to adjust the distance between the telescopic rod and the upper base 1 and lower base 3 as needed, allowing users to expand more photography application scenarios.

As shown in FIGS. 1 and 3, one end of the first rotating unit 520 connected to the bearing outer ring 421 is provided with multiple connecting fins 5201, which extend outward to form a clearance space for avoiding the second connecting end 411. The first rotating unit 520 includes multiple first cantilevers 5202, and the second rotating unit 521 includes second cantilevers 5210 corresponding to the first cantilevers 5202, each of which is nested inside the first cantilever 5202. The first cantilever 5202 is slidably connected to the second cantilever 5210, and the second cantilever 5210 is installed on the first cantilever 5202 through the fasteners 5200.

As shown in FIG. 6, the side of the upper base frame 110 has a channel G, which is equipped with ambient lights L, such as LED lights. The outer side of the channel G is equipped with a transparent cover C that adheres to the upper base frame 110. Similarly, the side of the lower base frame 31 has a channel G, which is equipped with ambient lights L, such as LED lights. The outer side of the channel G is equipped with a transparent cover C that adheres to the lower base frame 31. For example, the channel G and the ambient light L set inside the channel G can be covered with transparent acrylic to ensure that the LED light is not damaged due to collision during use or transportation, and to make the light softer, more uniform, and not glaring, enhancing the texture of the equipment.

As shown in FIGS. 1 and 3, the rotatable camera mounting device also includes an AI voice device 6 and a main control device 7. The main control device 7 is configured to create instructions and control the rotatable camera mounting device to perform actions after obtaining user voice collected by the AI voice device 6. The main control device 7 can be used to control the rotation of the motor. The main control device 7 can control the turn on, turn off, light mode switching, or brightness adjustment of the ambient lighting. The AI voice device 6 includes a microphone device configured to capture the user's voice when they speak. User voice can include words, sentences, songs, etc. The AI voice device 6 also includes a speaker device, which is configured to provide voice feedback under the control of the main control device 7 when the microphone device acquires user voice. The actions include controlling the activation, deactivation, lighting mode switching, or brightness adjustment of ambient lighting. It should be further explained that both the AI voice device 6 and the driving device are installed on the side of the lower base near the foot cup, which is more convenient for installation, disassembly, maintenance, etc.

The rotatable camera mounting device can be equipped with a 3D holographic device, which can display contents such as time, pictures, animations, etc., further enhancing the entertainment; a stable skeletal structure, including multiple reinforcing beams, greatly enhancing the strength of the upper base; LED ambient light, which enhances the fun and playability of the device; an AI voice control unit, greatly improving the efficiency and scene application of the device by adjusting the rotation of the device, switching or changing lights, and turning on and off the device by voice, enhancing the interaction between people and the device; the main electrical components such as the control device and motor are all located on the lower base, which can be installed and removed without disassembling the upper base, making it easy to install and maintain the entire machine.

The above description is only the preferred embodiment of the present disclosure and is not intended to limit the present disclosure. Any modifications, equivalent substitutions, and improvements made within the spirit and principles of the present disclosure should be included in the scope of protection of the present disclosure.

What is claimed is:

1. A rotatable camera mounting device, wherein comprising:
   an upper base,
   wherein, the upper base comprises a loading surface and an upper base body connected to the loading surface, the upper base body comprises an upper base frame, a first connecting member, and a first reinforcing skeleton connected to the upper base frame, the first connecting member is provided with a third opening, and one end of the first connecting member away from the loading surface is provided with a first connecting surface,
   wherein the loading surface is provided with a first opening, and the rotatable camera mounting device further comprises a 3D holographic device the 3D holographic device comprising a 3D holographic device body extending into an accommodating cavity through the third opening and a 3D holographic device fixing surface, and the accommodating cavity is enclosed by the first connecting member and the first reinforcing skeleton.

2. The rotatable camera mounting device according to claim 1, wherein the first connecting member is provided with a second opening opposite to the first opening and the third opening is opposite to the second opening.

3. The rotatable camera mounting device according to claim 1, wherein the first reinforcing skeleton comprises two or more first reinforcing beams, and two ends of each of the first reinforcing beams are connected to the upper base frame.

4. The rotatable camera mounting device according to claim 3, wherein the upper base body further comprises a second reinforcing skeleton, wherein the second reinforcing skeleton comprises two or more second reinforcing beams, and two ends of each of the second reinforcing beams are respectively connected to the upper base frame and the first reinforcing beam.

5. The rotatable camera mounting device according to claim 4, wherein the first connecting member comprises grooves that match the first reinforcing skeleton.

6. The rotatable camera mounting device according to claim 5, wherein when the first reinforcing skeleton comprises two of the first reinforcing beams, the first connecting member comprises two grooves, and each groove is equipped with one of the first reinforcing beams.

7. The rotatable camera mounting device according to claim 6, wherein the first connecting member is provided with a first limiting surface opposite to the first connecting surface.

8. The rotatable camera mounting device according to claim 4, wherein the upper base further comprises a transparent plate that matches the first opening.

9. The rotatable camera mounting device according to claim 1, wherein the rotatable camera mounting device further comprises a lower base opposite to the upper base and a connecting unit connecting the upper base and the lower base.

10. The rotatable camera mounting device according to claim 9, wherein the connecting unit comprises a second connecting member connected to the first connecting member, a bearing member connected to the second connecting member, and a third connecting member connected to the bearing member and the lower base.

11. The rotatable camera mounting device according to claim 10, wherein the second connecting member is provided with a second connecting surface near the first connecting surface, and the first connecting surface is connected to the second connecting surface, and the 3D holographic device fixing surface is connected to the first connecting surface or the second connecting surface.

12. The rotatable camera mounting device according to claim 11, wherein the second connecting member is provided with a second connecting end away from the first connecting surface, and the second connecting end is connected to an upper end surface of a bearing inner ring of the bearing member.

13. The rotatable camera mounting device according to claim 12, wherein a third connecting surface is provided on one end of the third connecting member near the bearing member, and the third connecting surface is connected to a lower end surface of the bearing inner ring of the bearing member.

14. The rotatable camera mounting device according to claim 13, wherein the lower base is provided with a lower base frame and a third reinforcing skeleton, and the third reinforcing skeleton intersects with each other to form a fourth connecting end for connecting the third connecting member.

15. The rotatable camera mounting device according to claim 14, wherein the rotatable camera mounting device further comprises a driving device, the driving device comprising a motor, a driving wheel connected to the motor, the bearing member, and a rotating device connected to the bearing member, wherein the bearing member rotates with the driving wheel.

16. The rotatable camera mounting device according to claim 15, wherein the bearing member further comprises a bearing outer ring, wherein the bearing outer ring is provided with teeth that match the driving wheel, and one end of the rotating device is connected to the bearing outer ring.

17. The rotatable camera mounting device according to claim 16, wherein the rotating device comprises a first rotating unit connected to the bearing outer ring, a second rotating unit connected to the first rotating unit, and a third rotating unit rotatably connected to the second rotating unit.

18. The rotatable camera mounting device according to claim 17, wherein the second rotating unit is nested inside the first rotating unit, and fasteners are provided on the first rotating unit to adjust length of the second rotating unit nested inside the first rotating unit and to fix the second rotating unit, one end of the first rotating unit connected to the bearing outer ring is provided with multiple connecting fins, which extend outward to form a clearance space for avoiding the second connecting end.

* * * * *